(12) United States Patent
Zhao et al.

(10) Patent No.: US 11,726,695 B2
(45) Date of Patent: *Aug. 15, 2023

(54) ELECTRICAL MIRRORING BY NAND FLASH CONTROLLER

(71) Applicant: Innogrit Technologies Co., Ltd., Shanghai (CN)

(72) Inventors: Gang Zhao, Chandler, AZ (US); Jie Chen, Milpitas, CA (US); Lin Chen, Cupertino, CA (US); Wei Jiang, Fremont, CA (US)

(73) Assignee: Innogrit Technologies Co., Ltd., Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/563,130

(22) Filed: Dec. 28, 2021

(65) Prior Publication Data
US 2022/0121369 A1    Apr. 21, 2022

Related U.S. Application Data

(63) Continuation of application No. 16/891,428, filed on Jun. 3, 2020, now Pat. No. 11,249,674.

(51) Int. Cl.
*G06F 3/06*    (2006.01)
*G06F 13/16*   (2006.01)

(52) U.S. Cl.
CPC ............ *G06F 3/065* (2013.01); *G06F 3/0619* (2013.01); *G06F 3/0679* (2013.01); *G06F 13/1668* (2013.01)

(58) Field of Classification Search
CPC ...... G06F 3/065; G06F 3/0619; G06F 3/0679; G06F 3/061; G06F 3/0629; G06F 3/0658; G06F 3/0688; G06F 13/1668; G06F 2212/1016; G06F 2212/7206; G06F 2212/7208; G06F 8/63
See application file for complete search history.

(56) References Cited

U.S. PATENT DOCUMENTS

| | | | | |
|---|---|---|---|---|
| 9,553,611 | B2 * | 1/2017 | Teitel | G06F 11/1076 |
| 11,249,674 | B2 * | 2/2022 | Zhao | G06F 13/1668 |
| 2003/0185082 | A1 * | 10/2003 | Schnell | G11C 17/16 365/201 |
| 2014/0108702 | A1 * | 4/2014 | Mizushima | G06F 12/0246 711/103 |

* cited by examiner

*Primary Examiner* — Hiep T Nguyen
(74) *Attorney, Agent, or Firm* — Ipro, PLLC

(57) ABSTRACT

Systems, apparatus and methods are provided for electrical mirroring implemented by a storage controller in a non-volatile storage system. In one embodiment, a non-volatile storage system may comprise a plurality of non-volatile storage devices and a storage controller. The storage controller may be configured to perform an electrical mirroring configuration process comprising: determining a system topology of the non-volatile storage system and which targets are in mirrored non-volatile storage devices and setting respective register bits in the storage controller for all targets in all mirrored non-volatile storage devices of the plurality of non-volatile storage devices.

20 Claims, 5 Drawing Sheets

US 11,726,695 B2

ELECTRICAL MIRRORING BY NAND FLASH CONTROLLER

TECHNICAL FIELD

This disclosure herein relates to the NAND flash controller architecture and implementation, particularly relates to the multi-drop multi-load NAND interface topology where a number of NAND flash devices share a common data bus with a NAND controller.

BACKGROUND

The evolution of the modern computing system is driven in-part by the emergence of the Solid State Drives (SSDs) that have demonstrated higher performance of speed and latency over the traditional hard drives. Unlike hard drives that depend on the magnetism to store data, solid state drives use NAND flash devices to achieve data storage. The NAND flash devices are a family of integrated circuits that are manufactured by advanced process and assembly technologies to achieve multiple levels of vertical stacking of storages units into a small footprint of package for high capacity of storage.

A typical SSD consists of a controller and a number of NAND flash devices which are placed on and connected through a printer circuit board (PCB) with a standard form factor for various consumer or enterprise usage models. The interface between the controller and NAND flash devices is grouped into channels, and a modern controller usually has 4, 8 or 16 NAND channels. In order to achieve higher storage capacity, the SSD needs to integrate more NAND flash devices into the PCB, thereby resulting in multiple NAND devices sharing a single channel. As a result, a multi-load or multi-drop PCB topology is often in place for the design of high-density SSD.

SUMMARY

A typical high capacity SSD multi-load PCB, whether in a M.2 or U.2 form factor, often adopts a so-called clamshell topology of NAND flash placement. In this topology, the NAND device on one side of a PCB may be fully overlapped with the NAND device on the other side. Because the pins for a NAND device may be positioned on one side of the NAND device. One of the two NAND devices may be flipped for mounting and placement. The pin order for the flipped NAND device may be in a fully mirrored order to that of the not-flipped NAND device. For example, in terms of zero based indexing for an eight-bit data bus of DQ[0 . . . 7], this means that DQ[0] of the flipped NAND device will be aligned with DQ[7] of the not-flipped NAND device, DQ[1] of the flipped NAND device will be aligned with DQ[6] of the not-flipped NAND device, and so on and so forth.

This placement, however, introduces challenges to PCB layout and signal integrity. For example, the same DQ pins of the flipped NAND device and the not-flipped NAND device will be always in symmetrical positions with respect to the center line of the NAND devices. That is, for example, DQ[0] of the flipped NAND device and DQ[0] of the not-flipped NAND device will be positioned on opposite sides at symmetrical positions with respect to the center line of the NAND devices, DQ[1] of the flipped NAND device and DQ[1] of the not-flipped NAND device will be positioned on opposite sides at symmetrical positions with respect to the center line of the NAND devices, and so on and so forth. As a result, if the two NAND devices in a mirrored configuration share one channel, the same two DQ pins (e.g., DQ[0] of the flipped NAND device and DQ[0] of the not-flipped NAND device) are normally connected to vias placed along the center line of the NAND devices, and there will be two relatively long traces routed from the via to the pins. These trace lengths are usually in the range of 300-mil to 500-mil. On the other hand, signal integrity specification for the high-speed NAND interface requires those trace lengths to be as short as possible, with maximum length less than 200-mil. Having such long trace lengths tend to cause NAND performance degradation of one to two speed grades, which is particularly a challenge for the high-capacity NAND device with heavy capacitive loading.

One approach to resolve the issue of signal integrity degradation may be to have two sets of the pin maps for the same NAND devices: a regular pin map and a reversed pin map. The reversed pin map may have a reversed data pin order. That is, DQ[7] data pin in the reversed pin map may be put in the position for the DQ[0] data pin in the regular pin map, DQ[6] data pin in the reversed pin map may be put in the position for the DQ[1] data pin in the regular pin map, and so on and so forth. Therefore, a NAND device with a regular pin map may be matched with a NAND device with a reversed pin map and the data pins of the two NAND devices may be matched and mirrored on two sides of a PCB. This will enable the via placement next to the pins and a very short trace about ~20-mil long to be routed from the via to the data pins. This solution will greatly enhance the PCB layout quality and resolve the aforementioned signal integrity degradation, to help enable the system to reach much higher NAND interface speed. This technique of reversing or mirroring NAND Data pin order may be referred to as electrical mirroring.

The existing solution uses a dedicated electrical mirroring command sent from the controller to the NAND flash device right after device initialization. The NAND device sees this command and then configures itself into the mirrored mode in which the DQ pins are reversed from the regular pin map. That is, pin DQ0 is now configured as DQ7 inside the NAND device, DQ1 becomes DQ6, and so on and so forth. However, the NAND device has to be configured to support this electrical mirroring feature.

Moreover, the electrical mirroring configuration command has zero tolerance of error. It has to be sent right after initialization, once and for all. Because it is sent before any of the device trainings and tuning can be done, the chance of error and failure is significantly high. Once it fails, the entire NAND device cannot be accessed until the next power cycle because NAND devices do not have any RESET mechanism. And a power cycle is not desired by any of the client or enterprise system users. In fact, this electrical mirroring feature is often avoided because of the high failure rate.

Therefore, this is a need in the art for a more flexible and robust electrical mirroring technique. A new electrical mirroring technique may be developed and implemented within the NAND flash controller. In various embodiments, the NAND device that needs to be mirrored will have its data pins connected in a reversed order to the controller's data pins. The controller may use firmware to determine whether electrical mirroring is enabled or disabled for each individual NAND device and implement a set of registers with bits corresponding to each individual NAND device to be set by the firmware during a configuration process (e.g., power on initialization). Once the electrical mirroring is enabled for a NAND device, the controller may reverse the order of data bits before sending it to the NAND device with reversed data pins, and also reverse the order of data bits received from the NAND device with reversed data pins.

In an exemplary embodiment, there is provided a method that may comprise determining a system topology of a non-volatile storage system and which targets are in mirrored non-volatile storage devices, and setting respective register bits in a storage controller for all targets in all mirrored non-volatile storage devices.

In another exemplary embodiment, there is provided a non-volatile storage system. The non-volatile storage system may comprise a plurality of non-volatile storage devices and a storage controller. The storage controller may be configured to perform an electrical mirroring configuration process comprising: determining a system topology of the non-volatile storage system and which targets are in mirrored non-volatile storage devices and setting respective register bits in the storage controller for all targets in all mirrored non-volatile storage devices of the plurality of non-volatile storage devices.

In yet another exemplary embodiment, there is provided a non-transitory machine-readable medium. The non-transitory machine-readable medium may have computer instructions that when executed by a hardware processor, may cause the hardware processor to perform determining a system topology of a non-volatile storage system and which targets are in mirrored non-volatile storage devices and setting respective register bits in a storage controller for all targets in all mirrored non-volatile storage devices.

DETAILED DESCRIPTION

Figure 1:
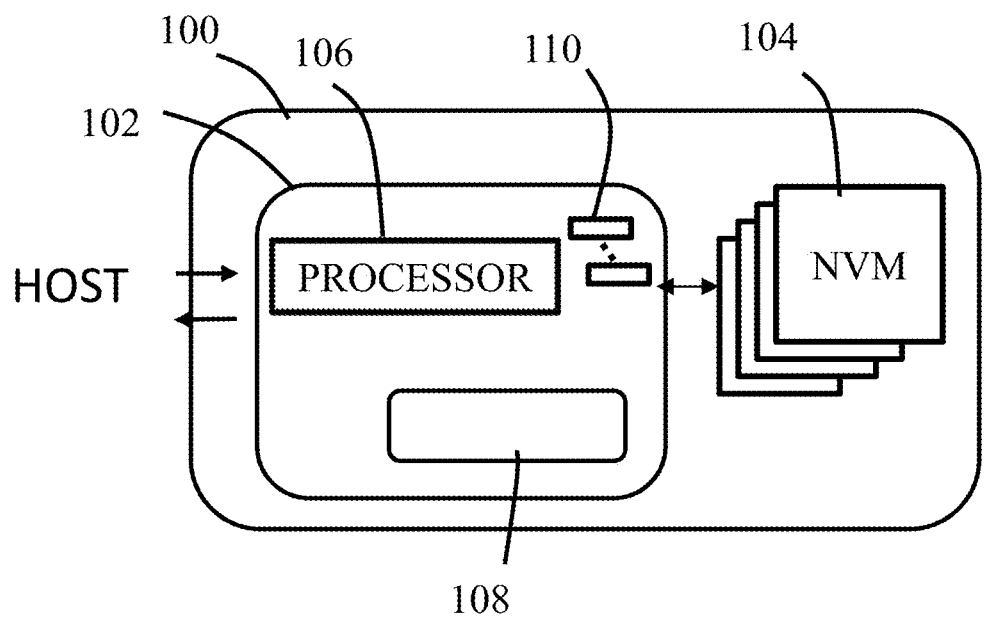
FIG. 1 schematically shows a non-volatile storage system in accordance with an embodiment of the present disclosure.

Specific embodiments according to the present disclosure will now be described in detail with reference to the accompanying figures. Like elements in the various figures are denoted by like reference numerals for consistency.

The present disclosure provides systems and methods for electrical mirroring by a storage controller. In various embodiments, a non-volatile storage device in a non-volatile storage system such as an SSD may have its data pins connected in a reversed order to the storage controller's data pins. The controller may let firmware determine whether electrical mirroring is enabled or disabled for each individual non-volatile memory device and implement a set of registers with bits corresponding to each individual non-volatile memory device to be set by the firmware during a configuration process (e.g., power on initialization). Once the electrical mirroring is enabled for a non-volatile memory device, the controller may reverse the order of data bits before sending it to the non-volatile memory device with reversed data pins, and also reverse the order of data bits received from the non-volatile memory device with reversed data pins.

As used herein, a non-volatile memory device may be a computer storage device that can maintain stored information after being powered off, and the stored information may be retrieved after being power cycled (turned off and back on). Non-volatile storage devices may include NAND flash memories, NOR flash memories, magnetoresistive random Access Memory (MRAM), resistive random access memory (RRAM), phase change random access memory (PCRAM), Nano-RAM, etc. In the description, a NAND flash may be used as an example to demonstrate the controller implemented electrical mirroring techniques. However, various embodiments according to the present disclosure may implement the techniques with other types of non-volatile storage devices.

FIG. 1 schematically shows a non-volatile storage system 100 in accordance with an embodiment of the present disclosure. The non-volatile storage system 100 may comprise a non-volatile storage controller 102 and a plurality of non-volatile memories (NVMs) 104. The non-volatile storage system 100 may provide data storage and/or access to stored data to a host when it is coupled to the host. The plurality of NVMs 104 may be, for example, NAND devices. In some embodiments, one NAND device may comprise one NAND target that may be controlled by a chip enable (CE) signal. In some other embodiments, one NAND device may comprise a plurality of NAND targets (e.g., two targets) that each NAND target may have its own CE signal. As used herein, a storage target in a NVM storage device may be a unit of the storage device accessed by a chip enable signal and may be simply referred to as a target. The plurality of NVMs 104 may be connected to the non-volatile storage controller 102 by a plurality of channels with each target being connected to one channel and one channel shared by a plurality of targets.

At least two NVMs of the plurality of NVMs 104 may be put in a mirrored configuration with one of the two NVMs at one side of a PCB and the other one of the two NVMs at the same position but opposite side the PCB. One of the two NVMs in the mirrored configuration may have data pins connected to the data bus of a channel in a regular order and the other one of the two NVMs in the mirrored configuration may have data pins connected to the data bus in a reversed order. As used herein, a NVM may be referred to as connected in a reversed order when its data pins are connected to a data bus in the reversed order and such a reversely connected NVM may also be referred to as a flipped NVM, a mirrored NVM, or a NVM in a mirrored mode. Further, a NVM connected in a regular data bit order may be referred to as a not-flipped NVM or a non-mirrored NVM.

The non-volatile storage controller 102 may comprise a processor 106, a non-transitory computer-readable storage media 108 and a plurality of registers 110. The processor 106 may be a computer processor, such as, but not limited to, a microprocessor or a microcontroller. In some embodiments, each of the plurality of registers 110 may have a plurality of bits such that each target of the plurality of NVMs 104 may have a corresponding bit in the plurality of registers 110. The plurality of registers 110 may be configured to indicate which target of the plurality of NVMs 104 may be connected in a reversed order. In at least one embodiment, some or all of the processor 106, the storage media 108 and registers 110 may be integrated in one Integrated Circuit (IC) chip.

In one embodiment, each register of the plurality of registers 110 may be assigned to one channel (e.g., one register per channel) and each register bit may be assigned to one target of one NVM device of the channel (e.g., one bit per CE). In an example implementation, the register may be referred to as DQ_MIRROR_EN as shown in Table 1 below, in which a bit may be set (e.g., set to one) to enable the electrical mirroring mode of a corresponding NAND target.

TABLE 1

Register definition of DQ_MIRROR_EN

| Register Name | Bit-Width | Description |
| --- | --- | --- |
| DQ_MIRROR_EN | [15:0] | Each bit corresponding to one CE<br>0 h: electrical mirror mode disabled<br>1 h: electrical mirror mode enabled (e.g., DQ0 coupled to DQ7 of data bus; DQ1 coupled to DQ6 of data bus; . . . ; DQ7 coupled to DQ0 of data bus) |

In the example of Table 1, the register may have a 16-bit width. With each bit corresponding to one NAND target, the 16-bit register may support up to 16 targets per channel. The register bits may be set based on system topology. Once a DQ_MIRROR_EN register bit is set to 1, the controller 102 may be notified that the corresponding NAND device (e.g., the NAND device containing the corresponding target) has the data pins connected in a reverse order, so the controller may need to reverse the data bit order internally before sending the data or after receiving the data.

It should be noted that the example uses a register bit set to one (1) to indicate a corresponding NVM target may be connected in a reversed order, but in some embodiments, a register bit set to zero (0) may be used to indicate a corresponding NVM target connected in a reversed order. Moreover, it should be noted that the register may have a different width compared to the data bus. In the example shown above, the data bus may have a 8-bit width but the register may have 16 bits.

In some embodiments, the register bits of the plurality of registers 110 corresponding to reversely connected NVMs of the plurality of NVMs 104 may be set during an electrical mirroring configuration process. For example, the electrical mirroring configuration process may be part of an initialization process of the non-volatile storage system 100 performed when the non-volatile storage system 100 is powered on or reset. During the electrical mirroring configuration process, the processor 106 may execute computer instructions (e.g., firmware) stored in the non-transitory computer-readable storage media 108 to determine system topology and set the register bits based on the determined system topology. In some embodiments, the non-transitory computer-readable storage media 108 may be a read only memory (e.g., Erasable Programmable Read Only Memory or other suitable ROM) typically used for storing firmware, which may be low-level software instructions that when executed by the processor 106, may cause the processor 106 to directly access the registers of the controller, to configure, control and program the behaviors of the controller and the system.

In one embodiment, the processor 106 may execute computer instructions stored in the non-transitory computer-readable storage media 108 to determine which NVM of the plurality of NVMs may be connected in a reversed order and set bits corresponding to targets in the reversely connected NVMs in the plurality of registers 110. For example, the firmware may be programmed to designate one side as a regular order connection side (e.g., top side) and another side as the reversed order connection side (e.g., bottom side) and the processor 106 may determine which NVMs of the plurality of NVMs 104 may be positioned on the regular order connection side and which NVMs of the plurality of NVMs 104 may be positioned on the reversed order connection side.

During operations for the non-volatile storage system 100, the non-volatile storage controller 102 may be configured to reverse data bit orders before sending data to a reversely connected target and after receiving data from a reversely connected target. In one embodiment, the processor 106 may execute software instructions to check registers 110 to determine whether a target is reversely connected and carry out data reversal operations if necessary. If a NAND target is connected in regular order, data may be sent from the non-volatile storage controller 102 to the NAND target and received from the NAND target without any data reversal operations.

If a NAND target is reversely connected (e.g., electrical mirroring register bit enabled), for a write operation, the non-volatile storage controller 102 may reverse the data bit order from DQ[7:0] to DQ[0:7] before sending the data out on the data bus. That is, the non-volatile storage controller 102 may swap data bits DQ[0] and DQ[7], swap data bits DQ[1] and DQ[6], and so on for all data bits. The NAND device may receive the data in the original order of DQ[7:0]. That is, because the data pins of the NAND device are connected to the data bus in a reversed order, data pin DQ[0] of the NAND device may receive the data bit for DQ[0] in the non-volatile storage controller 102 before the reversal operation, data pin DQ[1] of the NAND device may receive the data bit for DQ[1] in the non-volatile storage controller 102 before the reversal operation, and so on.

For a read operation with the mirrored NAND device, the non-volatile storage controller 102 may receive the data of DQ[7:0] in the reversed order as DQ[0:7]. The non-volatile storage controller 102 may determine that the received data is in the reversed data bit order by checking the corresponding register bit in the registers 110, and then perform a data bit order reversal to recover the data in the original order as DQ[7:0].

Figure 2:
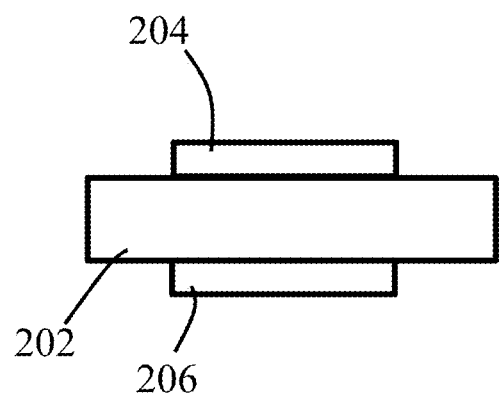
FIG. 2 schematically shows a mirrored configuration of two non-volatile storage devices in accordance with an embodiment of the present disclosure.

FIG. 2 schematically shows two non-volatile storage devices 204 and 206 in a mirrored configuration in accordance with an embodiment of the present disclosure. The two non-volatile storage devices 204 and 206 may be attached to a same position but two opposite sides of a substrate or base 202, respectively. That is, the two non-volatile storage devices 204 and 206 may overlap with each other in a clamshell topology. The substrate 202 may be a printed circuit board (PCB) or other suitable substrate. The two non-volatile storage devices 204 and 206 may be two of the plurality of NVMs 104 and the substrate 202 may be a PCB in the non-volatile storage system 100.

Figure 3:
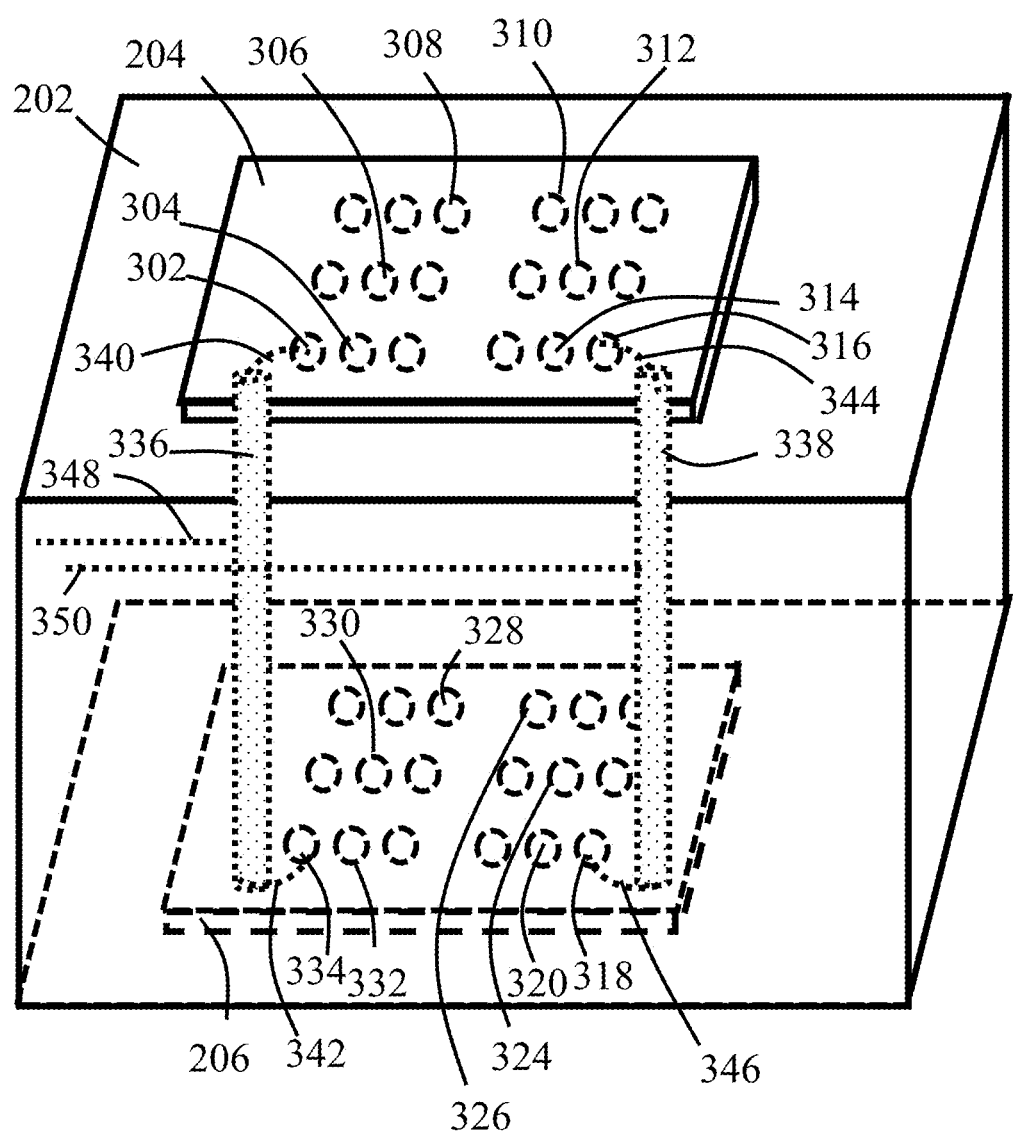
FIG. 3 schematically shows details of a mirrored configuration of two non-volatile storage devices in accordance with an embodiment of the present disclosure.

FIG. 3 schematically shows details of the two non-volatile storage devices 204 and 206 in the mirrored configuration in accordance with an embodiment of the present disclosure. In the example of FIG. 3, the data bus of a channel may be 8 bits. But in other embodiments, the data bus of a channel may be 16 bits, 32 bits, or other suitable number of bits. The non-volatile storage device 204 may be positioned on a top side of the PCB 202 and have data pins DQ[0] 302, DQ[1] 304, DQ[2] 306, DQ[3] 308, DQ[4] 310, DQ[5] 312, DQ[6] 314 and DQ[7] 316. The data pins DQ[0] 302, DQ[1] 304, DQ[2] 306, DQ[3] 308, DQ[4] 310, DQ[5] 312, DQ[6] 314 and DQ[7] 316 may be underneath the non-volatile storage device 204 and shown in dashed lines. The non-volatile storage device 206 may be positioned on a bottom side of the PCB 202 and have data pins DQ[0] 318, DQ[1] 320, DQ[2] 324, DQ[3] 326, DQ[4] 328, DQ[5] 330, DQ[6] 332 and DQ[7] 334. The non-volatile storage device 206 and its data pins DQ[0] 318, DQ[1] 320, DQ[2] 324, DQ[3] 326, DQ[4] 328, DQ[5] 330, DQ[6] 332 and DQ[7] 334 may be also shown in dashed lines.

In the mirrored configuration of FIG. 3, DQ[0] 302 of the non-volatile storage device 204 may be in a mirrored position of DQ[7] 334 of the non-volatile storage device 206, DQ[1] 304 of the non-volatile storage device 204 may be in a mirrored position of DQ[6] 332 of the non-volatile storage device 206, DQ[2] 306 of the non-volatile storage device 204 may be in a mirrored position of DQ[5] 330 of the non-volatile storage device 206, DQ[3] 308 of the non-volatile storage device 204 may be in a mirrored position of DQ[4] 328 of the non-volatile storage device 206, DQ[4] 310 of the non-volatile storage device 204 may be in a mirrored position of DQ[3] 326 of the non-volatile storage device 206, DQ[5] 312 of the non-volatile storage device 204 may be in a mirrored position of DQ[2] 324 of the non-volatile storage device 206, DQ[6] 314 of the non-volatile storage device 204 may be in a mirrored position of DQ[1] 320 of the non-volatile storage device 206 and DQ[7] 316 of the non-volatile storage device 204 may be in a mirrored position of DQ[0] 318 of the non-volatile storage device 206. As used herein, a mirrored position may refer to the same position but opposite side of the PCB.

As shown in FIG. 3, DQ[0] 302 of the non-volatile storage device 204 may be connected to a via 336 by a trace 340 and DQ[7] 334 of the non-volatile storage device 206 may be connected to the via 336 by a trace 342. The via 336 may be connected to a trace 348 for DQ[0] of the data bus of a channel. DQ[7] 316 of the non-volatile storage device 204 may be connected to a via 338 by a trace 344 and DQ[0] 318 of the non-volatile storage device 206 may be connected to the via 338 by a trace 346. The via 338 may be connected to a trace 350 for DQ[7] of the data bus of a channel. Because every pair of data pins connected by a via may be in mirrored positions, the traces connecting the data pins to the via (e.g., traces 340, 342, 344 and 346) may be short. This may allow for a good quality PCB layout and higher speed NAND interface. The data connections may be shown in dotted lines in FIG. 3 to indicate that they may be buried inside the PCB 202. It should be noted that other data connections (e.g., vias and traces for other data pins) may be omitted in FIG. 3 for simplicity.

Figure 4:
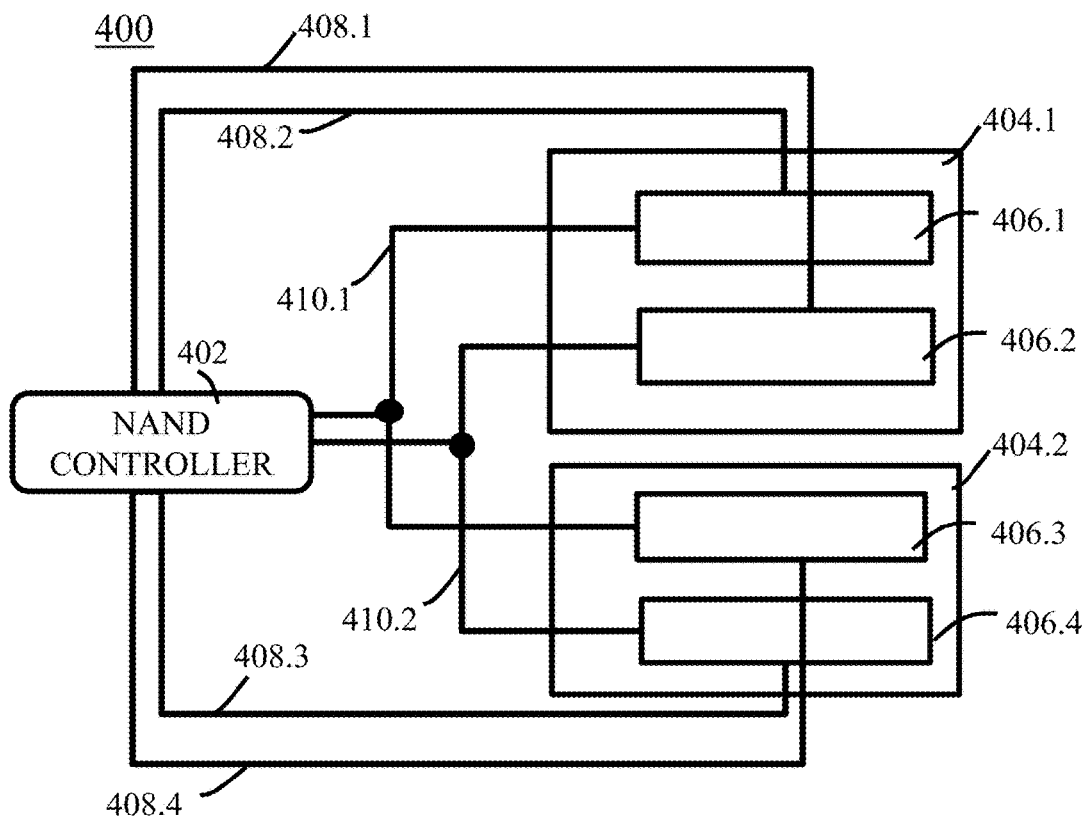
FIG. 4 schematically shows a 2-channel non-volatile storage system in accordance with an embodiment of the present disclosure.

FIG. 4 schematically shows a 2-channel non-volatile storage system 400 in accordance with an embodiment of the present disclosure. The 2-channel non-volatile storage system 400 may comprise a NAND controller 402, a first NAND device 404.1 and a second NAND device 404.2. The first NAND device 404.1 and the second NAND device 404.2 may be in a mirrored configuration. For example, the first NAND device 404.1 may be on a top side of a PCB and the second NAND device 404.2 may be on a bottom side of the PCB. The 2-channel non-volatile storage system 400 may be an embodiment of the non-volatile storage system 100.

The first NAND device 404.1 may comprise two NAND targets: NAND target 406.1 and NAND target 406.2. The second NAND device 404.2 may also comprise two NAND targets: NAND target 406.3 and NAND target 406.4. The NAND target 406.1 of the first NAND device 404.1 and the NAND target 406.3 of the second NAND device 404.2 may be connected to a first channel 410.1. The NAND target 406.2 of the first NAND device 404.1 and the NAND target 406.4 of the second NAND device 404.2 may be connected to a second channel 410.2. The NAND target 406.1 may be selected for data operations by a CE signal on a CE signal line 408.1. The NAND target 406.2 may be selected for data operations by a CE signal on a CE signal line 408.2. The NAND target 406.3 may be selected for data operations by a CE signal on a CE signal line 408.3. The NAND target 406.4 may be selected for data operations by a CE signal on a CE signal line 408.4. In one embodiment, the NAND device 404.2 may be a mirrored device. That is, the data pins of the NAND device 404.2 may be connected to the data bus for the channels 410.1 and 410.2 in a reversed order.

It should be noted that each channel may have its own data bus. In some embodiments, a NAND storage device may have two sets of data pins for two channels that may be independent from each other. In the example in FIG. 4, a NAND storage device may have two targets so each target in one device may be coupled to one channel. In some other embodiments, a NAND storage device may have more than two targets and some targets may share one set of data pins for a data bus. For example, if a device has 4 targets, then each 2 targets may share one set of data pins for a data bus of a channel. If the device has 8 targets, then each 4 targets may share a set of data pins for a data bus of a channel. But regardless how many targets are in a NAND storage device, if a NAND storage device is in a side of a PCB that data pins of the NAND storage device need to be connected in a reversed order, then all targets in the NAND storage device may have corresponding register bits set in the controller to indicate that they are reversely connected.

In one embodiment, the NAND controller 402 may comprise two electrical mirroring registers: one for channel 410.1 and another for channel 410.2. In the electrical mirroring register for channel 410.1, a bit corresponding to the NAND target 406.3 may be set during an electrical mirroring configuration process. Also, in the electrical mirroring register for channel 410.2, a bit corresponding to the NAND target 406.4 may be set during an electrical mirroring configuration process. For write and read operations, the NAND controller 402 may check the electrical mirroring registers to determine whether a NAND target is reversely connected and whether the data bit order reversal operation may be necessary.

Figure 5:
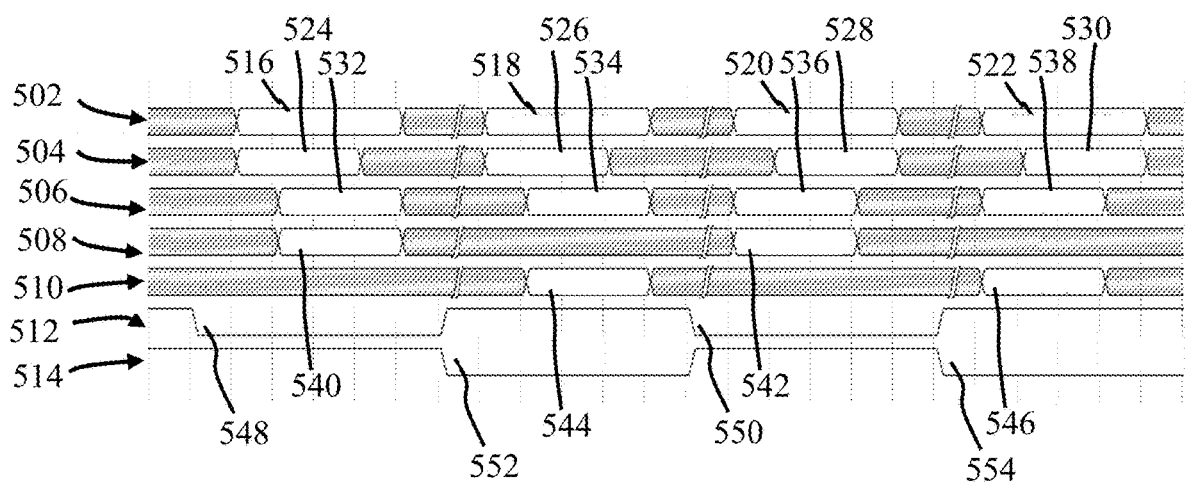
FIG. 5 schematically shows read and write signaling for the 2-channel non-volatile storage system in accordance with an embodiment of the present disclosure.

FIG. 5 schematically shows read and write signaling for the 2-channel non-volatile storage system 400 of FIG. 4 in accordance with an embodiment of the present disclosure. Signal line 502 may represent the cycle types. The signal block 516 may represent a write operation cycle to a NAND target of regular data bit order (e.g., a CE signal on the CE signal lines 408.1 or 408.2). The signal block 518 may represent a write operation cycle to a NAND target of reversed data bit order (e.g., a CE signal on the CE signal lines 408.3 or 408.4). The signal block 520 may represent a read operation cycle from a NAND target of regular data bit order (e.g., a CE signal on the CE signal lines 408.1 or 408.2). The signal block 522 may represent a read operation cycle from a NAND target of reversed data bit order (e.g., a CE signal on the CE signal lines 408.3 or 408.4).

Signal line 504 may represent data in the NAND controller 402. In blocks 524, 526, 528 and 530, data in the NAND controller 402 are all in regular bit order (e.g., DQ[7:0]).

Signal line 506 may represent data on the data bus. In block 532, data on the data bus may be in the regular data bit order because the cycle type is a write operation cycle for a regular data bit order NAND target. In block 534, data on the data bus may be in the reversed data bit order (e.g., DQ[0:7]) because the cycle type is a write operation cycle for a NAND target in a mirrored NAND device. In block 536, data on the data bus may be in the regular data bit order because the cycle type is a read operation cycle for a regular data bit order NAND target. In block 538, data on the data bus may be in the reversed data bit order because the cycle type is a read operation cycle for a NAND target in a mirrored NAND device.

Signal line 508 may represent data on the NAND device 404.1 and signal line 510 may represent data on the NAND device 404.2. In blocks 540 and 542, data in the NAND device 404.1 may be in regular data bit order. Because the NAND controller 402 may reverse data bit orders before sending data to the mirrored NAND device and after receiving data from the mirrored NAND device, in blocks of 544 and 546, data in the NAND device 404.2 may also be in regular data bit order. Signal line 512 may represent a CE signal line for the NAND device 404.1 (e.g., CE signal line 408.1 or CE signal line 408.2) and show that the CE signal may be set (e.g., pulled down) in signals 548 (e.g., write to a regular data bit order NAND target) and 550 (e.g., read from a regular data bit order NAND target). Signal line 514 may represent a CE signal line for the NAND device 404.2 (e.g., CE signal line 408.3 or CE signal line 408.4) and show that the CE signal may be set (e.g., pulled down) in signals 552 (e.g., write to a NAND target in a mirrored NAND device) and 554 (e.g., read from a NAND target in a mirrored NAND device).

As shown in FIG. 5, during a write operation to the NAND device 404.2 (e.g., a CE signal set on either signal line 408.3 or signal line 408.4), the NAND controller 402 may reverse the data bit order from regular data bit order (e.g., DQ[7:0]) to the reversed data bit order (e.g., DQ[0:7]) before sending the data on the data bus. Thus, the NAND device 404.2 may receive the data in the regular data bit order because the order is reversed again though the data pins to data bus connection.

To conduct a read operation from the NAND device 404.2 (e.g., a CE signal set on either signal line 408.3 or signal line 408.4), the controller 402 may receive the data on the data bus in a reversed order (e.g., DQ[0:7]). By determining that the electrical mirroring is enabled, the controller 402 may perform another data bit order reversal to recover data in the original data bit order DQ[7:0].

In both read and write operations for a mirrored device (e.g., the NAND device 404.2), data on the NAND channel data bus may always have a data bit order reversed from the data bit order of the data inside the NAND controller 402. The NAND controller 402 may manage the data bit order by performing a round of data reversal for the electrically mirrored devices. In contrast, the NAND device 404.1 may be connected to the data bus in a matching order as DQ[7:0] to DQ[7:0], and the electrical mirroring is not enabled for the NAND device 404.1. So for the NAND device 404.1, data on the data bus may be always in the same order as the data inside the controller 402.

Figure 6:
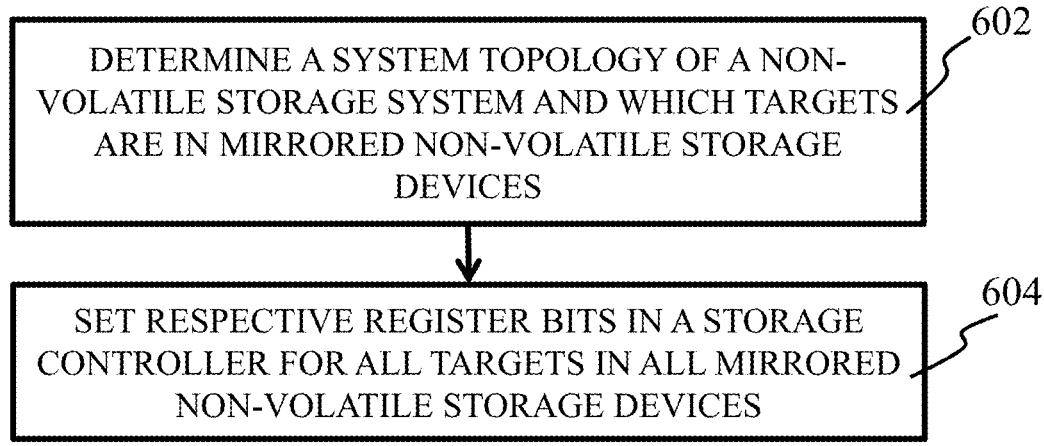
FIG. 6 is a flowchart of an electrical mirroring configuration process in accordance with an embodiment of the present disclosure.

FIG. 6 is a flowchart for an electrical mirroring configuration process 600 in accordance with an embodiment of the present disclosure. In block 602, a system topology of a non-volatile storage system and which targets are in mirrored non-volatile storage devices may be determined. For example, in some embodiments, the NAND controller 102 may be configured to determine the system topology and which targets are in mirrored non-volatile storage devices for the non-volatile storage system 100 during an electrical mirroring configuration process. In one embodiment, the system topology may include how many non-volatile storage devices are in the non-volatile storage system 100, the NVMs 104 are connected to the controller 102 in how many channels, how many targets are in each of the NVMs 104 and which targets in the NVMs 104 belong to which channel.

In block 604, respective register bits in a storage controller may be set for all targets in all mirrored non-volatile storage devices. For example, in some embodiments, the NAND controller 102 may comprise a plurality of registers. In one embodiment, one channel may be assigned one register with each bit of the register corresponding to one target in the channel. Register bits corresponding to targets in mirrored non-volatile storage devices may be set (e.g., electrical mirroring enabled).

Figure 7:
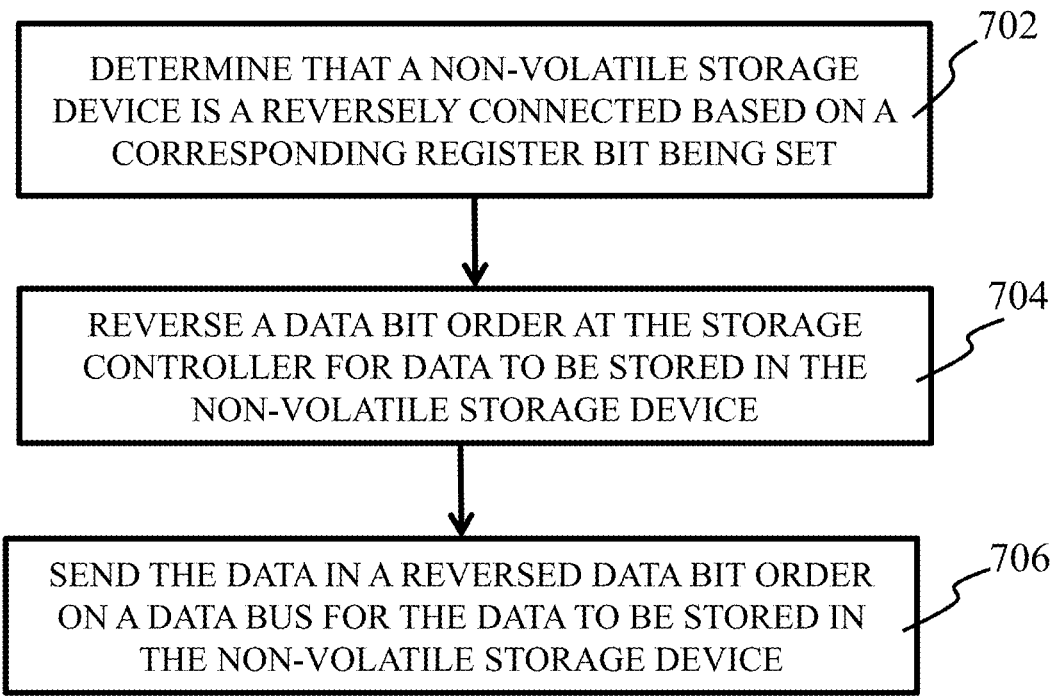
FIG. 7 is a flowchart of a process for a write operation to a mirrored NAND device in accordance with an embodiment of the present disclosure.

FIG. 7 is a flowchart of a process 700 for a write operation to a mirrored NAND device in accordance with an embodiment of the present disclosure. In block 702, a non-volatile storage device of the non-volatile storage system may be determined to be reversely connected based on a corresponding register bit being set. In one embodiment, a register bit corresponding to a target in a mirrored NVM may be set to indicate that the data pins for the target may be reversely connected. In block 704, a data bit order for data to be stored in the non-volatile storage device may be reversed at the storage controller. The data to be stored in the non-volatile storage device may be in an original data bit order at the storage controller before the reversal. In block 706, the data may be sent in a reversed data bit order on a data bus for the data to be stored in the non-volatile storage device. In various embodiments, because the target is in a mirrored storage device, the data pins are reversely connected, the data will be received and stored in the mirrored storage device in its original data bit order.

Figure 8:
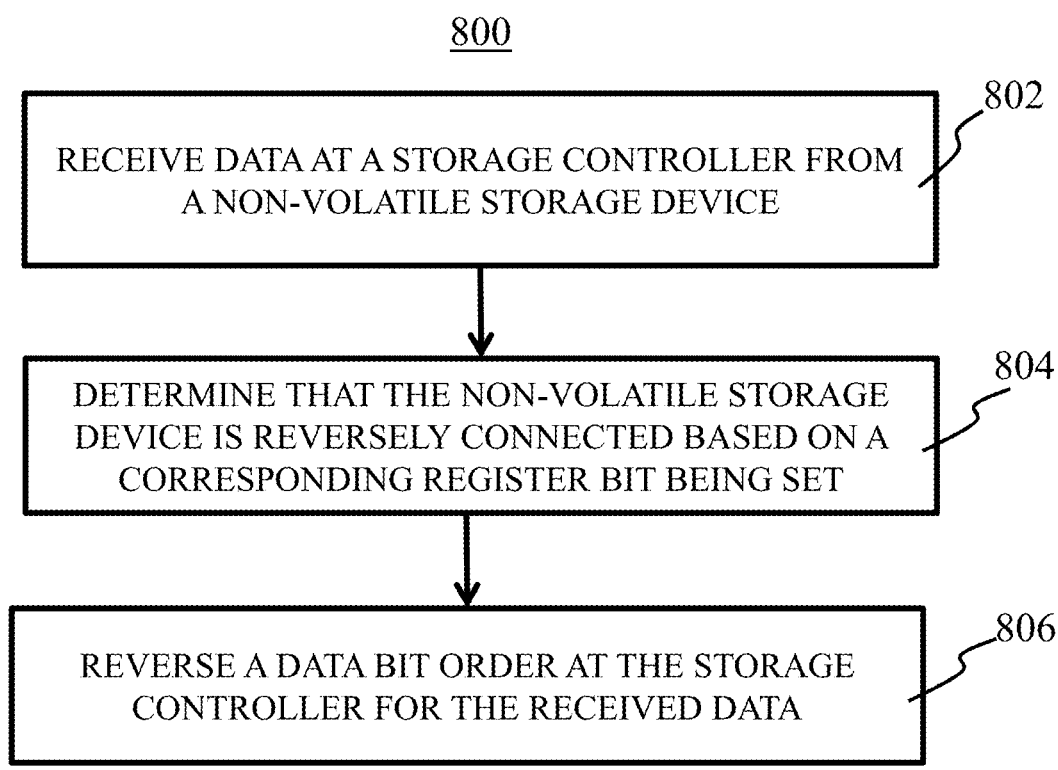
FIG. 8 is a flowchart of a process for a read operation from a mirrored NAND device in accordance with an embodiment of the present disclosure.

FIG. 8 is a flowchart of a process 800 for a read operation from a mirrored NAND device in accordance with an embodiment of the present disclosure. In block 802, data may be received at the storage controller from a non-volatile storage device of the non-volatile storage system. In block 804, the storage controller may determine that the non-volatile storage device is a mirrored non-volatile storage device based on a corresponding register bit being set. In block 806, the storage controller may reverse a data bit order for the received data.

Each of the processes 600, 700 and 800 may be implemented using software (e.g., executable by a computer processor (CPU, GPU, or both)), hardware (e.g., a field-programmable gate array (FPGA) or an application-specific IC (ASIC), firmware, or any suitable combination of the three. In one embodiment, for example, the electrical mirroring configuration process 600 may be implemented in hardware circuity (e.g., FPGA or ASIC). In another embodiment, the electrical mirroring configuration process 600 may be implemented in firmware and stored in a read-only memory (e.g., storage 108), and performed by the processor 106 executing the firmware. Moreover, the processes 700 and 800 may be programmed in computer processor executable instructions, stored in a non-transitory machine-readable medium (e.g., NVMs 104, CD, DVD, etc.) and performed by a computer processor (e.g., a microprocessor or a microcontroller) executing the executable instructions.

In an exemplary embodiment, there is provided a method that may comprise determining a system topology of a non-volatile storage system and which targets are in mirrored non-volatile storage devices, and setting respective register bits in a storage controller for all targets in all mirrored non-volatile storage devices.

In one embodiment, the system topology may include how many non-volatile storage devices are in the non-volatile storage system, the non-volatile storage devices are connected to a storage controller in how many channels, how many targets are in each of the non-volatile storage devices and which targets in the non-volatile storage devices belong to which channel.

In one embodiment, the storage controller may comprise a plurality of registers with each register corresponding to one channel.

In one embodiment, the method may further comprise determining that a non-volatile storage device of the non-volatile storage system is a mirrored non-volatile storage device based on a corresponding register bit being set, reversing a data bit order at the storage controller for data in an original data bit order to be stored in the non-volatile storage device and sending the data in a reversed data bit order on a data bus connected to the non-volatile storage device for the data to be stored in the original data bit order in the non-volatile storage device.

In one embodiment, the method may further comprise receiving data at the storage controller from a non-volatile storage device of the non-volatile storage system, determining that the non-volatile storage device is a mirrored non-volatile storage device based on a corresponding register bit being set and reversing a data bit order at the storage controller for the received data.

In one embodiment, each mirrored non-volatile storage device is paired with a non-mirrored non-volatile storage device in a mirrored configuration in which data pins of the mirrored non-volatile storage device may be connected by vias to data pins of the non-mirrored non-volatile storage device in a reversed order.

In another exemplary embodiment, there is provided a non-volatile storage system. The non-volatile storage system may comprise a plurality of non-volatile storage devices and a storage controller. The storage controller may be configured to perform an electrical mirroring configuration process comprising: determining a system topology of the non-volatile storage system and which targets are in mirrored non-volatile storage devices and setting respective register bits in the storage controller for all targets in all mirrored non-volatile storage devices of the plurality of non-volatile storage devices.

In one embodiment, the system topology may include how many non-volatile storage devices are in the non-volatile storage system, the non-volatile storage devices are connected to a storage controller in how many channels, which of the non-volatile storage devices are mirrored non-volatile storage devices and which targets in the non-volatile storage devices belong to which channel.

In one embodiment, the storage controller may comprise a plurality of registers with each register corresponding to one channel.

In one embodiment, the storage controller may be further configured to determine that a non-volatile storage device of the plurality of non-volatile storage devices is a mirrored non-volatile storage device based on a corresponding register bit being set, reverse a data bit order at the storage controller for data in an original data bit order to be stored in the non-volatile storage device and send the data in a reversed data bit order on a data bus connected to the non-volatile storage device for the data to be stored in the original data bit order in the non-volatile storage device.

In one embodiment, the storage controller may be further configured to receive data at the storage controller from a non-volatile storage device of the plurality of non-volatile storage devices, determine that the non-volatile storage device is a mirrored non-volatile storage device based on a corresponding register bit being set and reverse a data bit order at the storage controller for the received data.

In one embodiment, each mirrored non-volatile storage device may be paired with a non-mirrored non-volatile storage device in a mirrored configuration in which data pins of the mirrored non-volatile storage device may be connected by vias to data pins of the non-mirrored non-volatile storage device in a reversed order.

In one embodiment, the storage controller may comprise a non-transitory computer-readable storage media storing firmware and a processor configured to execute the firmware to perform the electrical mirroring configuration process.

In one embodiment, the storage controller may comprise hardware circuitry configured to perform the electrical mirroring configuration process.

In yet another exemplary embodiment, there is provided a non-transitory machine-readable medium. The non-transitory machine-readable medium may have computer instructions that when executed by a hardware processor, may cause the hardware processor to perform determining a system topology of a non-volatile storage system and which targets are in mirrored non-volatile storage devices and setting respective register bits in a storage controller for all targets in all mirrored non-volatile storage devices.

In one embodiment, the system topology may include how many non-volatile storage devices are in the non-volatile storage system, the non-volatile storage devices are connected to a storage controller in how many channels, how many targets are in each of the non-volatile storage devices and which targets in the non-volatile storage devices belong to which channel.

In one embodiment, the storage controller may comprise a plurality of registers with each register corresponding to one channel.

In one embodiment, the computer instructions, when executed by the hardware processor, may further cause the hardware processor to perform: determining that a non-volatile storage device of the non-volatile storage system is a mirrored non-volatile storage device based on a corresponding register bit being set, reversing a data bit order at the storage controller for data in an original data bit order to be stored in the non-volatile storage device and sending the data in a reversed data bit order on a data bus connected to the non-volatile storage device for the data to be stored in the original data bit order in the non-volatile storage device.

In one embodiment, the computer instructions, when executed by the hardware processor, may further cause the hardware processor to perform: receiving data at the storage controller from a non-volatile storage device of the non-volatile storage system, determining that the non-volatile storage device is a mirrored non-volatile storage device based on a corresponding register bit being set and reversing a data bit order at the storage controller for the received data.

In one embodiment, each mirrored non-volatile storage device may be paired with a non-mirrored non-volatile storage device in a mirrored configuration in which data pins of the mirrored non-volatile storage device may be connected by vias to data pins of the non-mirrored non-volatile storage device in a reversed order.

Any of the disclosed methods and operations may be implemented as computer-executable instructions (e.g., software code for the operations described herein) stored on one or more computer-readable storage media (e.g., non-transitory computer-readable media, such as one or more optical media discs, volatile memory components (such as DRAM or SRAM), or nonvolatile memory components (such as hard drives)) and executed on a device controller (e.g., firmware executed by ASIC). Any of the computer-executable instructions for implementing the disclosed techniques as well as any data created and used during implementation of the disclosed embodiments can be stored on one or more computer-readable media (e.g., non-transitory computer-readable media).

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method, comprising:
   enabling electrical mirroring for a non-volatile storage device by setting a corresponding register bit for the non-volatile storage device in a storage controller;
   receiving data to be stored in the non-volatile storage device, the data being received in an original data bit order;
   reversing a data bit order at the storage controller for the received data to generate data in a reversed data bit order; and
   sending the data in the reversed data bit order on a data bus connected to the non-volatile storage device for the received data to be stored in the original data bit order in the non-volatile storage device.

2. The method of claim 1, wherein the non-volatile storage device is a mirrored non-volatile storage device that has its data pins coupled to the data bus in a reversed pin order.

3. The method of claim 1, wherein the non-volatile storage device is a part of a non-volatile storage system and the method further comprises:
   determining a system topology of the non-volatile storage system including which targets are in mirrored non-volatile storage devices, wherein a target is a storage unit controlled by a chip enable signal, all mirrored non-volatile storage devices have their respective data pins coupled to the data bus in the reversed order, and each non-volatile storage device of the non-volatile storage system comprises one or more targets; and
   setting respective register bits in the storage controller for all targets in all mirrored non-volatile storage devices.

4. The method of claim 3, wherein the system topology further includes how many non-volatile storage devices are in the non-volatile storage system, the non-volatile storage devices are connected to the storage controller in how many channels, how many targets are in each of the non-volatile storage devices and which targets in the non-volatile storage devices belong to which channel.

5. The method of claim 4, wherein each mirrored non-volatile storage device is paired with a non-mirrored non-volatile storage device in a mirrored configuration in which data pins of each mirrored non-volatile storage device are connected by vias to data pins of a respectively paired non-mirrored non-volatile storage device in a reversed order.

6. The method of claim 4, wherein the storage controller comprises a plurality of registers with each register corresponding to one channel, and each register of the plurality of registers has a plurality of register bits with each register bit corresponding to one target.

7. The method of claim 1, further comprising:
   receiving stored data at the storage controller read from the non-volatile storage device;
   determining that the non-volatile storage device is a mirrored non-volatile storage device based on the corresponding register bit being set; and
   reversing a data bit order at the storage controller for the stored data.

8. A non-volatile storage system, comprising:
   a plurality of non-volatile storage devices; and
   a storage controller configured to:
      enable electrical mirroring for a non-volatile storage device of the plurality of non-volatile storage devices by setting a corresponding register bit for the non-volatile storage device in the storage controller;
      receive data to be stored in the non-volatile storage device, the data being received in an original data bit order;
      reverse a data bit order at the storage controller for the received data to generate data in a reversed data bit order; and
      send the data in the reversed data bit order on a data bus connected to the non-volatile storage device for the received data to be stored in the original data bit order in the non-volatile storage device.

9. The non-volatile storage system of claim 8, wherein the non-volatile storage device is a mirrored non-volatile storage device that has its data pins coupled to the data bus in a reversed pin order.

10. The non-volatile storage system of claim 8, wherein the storage controller is further configured to:
    determine a system topology of the non-volatile storage system including which targets are in mirrored non-volatile storage devices, wherein a target is a storage unit controlled by a chip enable signal, all mirrored non-volatile storage devices have their respective data pins coupled to the data bus in the reversed order, and each non-volatile storage device of the non-volatile storage system comprises one or more targets; and
    set respective register bits in the storage controller for all targets in all mirrored non-volatile storage devices.

11. The non-volatile storage system of claim 10, wherein the system topology further includes how many non-volatile storage devices are in the non-volatile storage system, the non-volatile storage devices are connected to the storage controller in how many channels, how many targets are in each of the non-volatile storage devices and which targets in the non-volatile storage devices belong to which channel.

12. The non-volatile storage system of claim 11, wherein each mirrored non-volatile storage device is paired with a non-mirrored non-volatile storage device in a mirrored configuration in which data pins of each mirrored non-volatile storage device are connected by vias to data pins of a respectively paired non-mirrored non-volatile storage device in a reversed order.

13. The non-volatile storage system of claim 11, wherein the storage controller comprises a plurality of registers with each register corresponding to one channel, and each register of the plurality of registers has a plurality of register bits with each register bit corresponding to one target.

14. The non-volatile storage system of claim 8, wherein the storage controller is further configured to:
- receive stored data at the storage controller read from the non-volatile storage device;
- determine that the non-volatile storage device is a mirrored non-volatile storage device based on the corresponding register bit being set; and
- reverse a data bit order at the storage controller for the stored data.

15. A non-transitory machine-readable medium having computer instructions, wherein the computer instructions, when executed by a hardware processor, cause the hardware processor to perform:
- enable electrical mirroring for a non-volatile storage device by setting a corresponding register bit for the non-volatile storage device in a storage controller;
- receive data to be stored in the non-volatile storage device, the data being received in an original data bit order;
- reverse a data bit order at the storage controller for the received data to generate data in a reversed data bit order; and
- send the data in the reversed data bit order on a data bus connected to the non-volatile storage device for the received data to be stored in the original data bit order in the non-volatile storage device.

16. The non-transitory machine-readable medium of claim 15, wherein the non-volatile storage device is a mirrored non-volatile storage device that has its data pins coupled to the data bus in a reversed pin order.

17. The non-transitory machine-readable medium of claim 15, wherein the non-volatile storage device is a part of a non-volatile storage system, and the computer instructions, when executed by the hardware processor, further cause the hardware processor to perform:
- determine a system topology of the non-volatile storage system including which targets are in mirrored non-volatile storage devices, wherein a target is a storage unit controlled by a chip enable signal, all mirrored non-volatile storage devices have their respective data pins coupled to the data bus in the reversed order, and each non-volatile storage device of the non-volatile storage system comprises one or more targets; and
- set respective register bits in the storage controller for all targets in all mirrored non-volatile storage devices.

18. The non-transitory machine-readable medium of claim 17, wherein the system topology further includes how many non-volatile storage devices are in the non-volatile storage system, the non-volatile storage devices are connected to the storage controller in how many channels, how many targets are in each of the non-volatile storage devices and which targets in the non-volatile storage devices belong to which channel, and wherein the storage controller comprises a plurality of registers with each register corresponding to one channel, and each register of the plurality of registers has a plurality of register bits with each register bit corresponding to one target.

19. The non-transitory machine-readable medium of claim 18, wherein each mirrored non-volatile storage device is paired with a non-mirrored non-volatile storage device in a mirrored configuration in which data pins of each mirrored non-volatile storage device are connected by vias to data pins of a respectively paired non-mirrored non-volatile storage device in a reversed order.

20. The non-transitory machine-readable medium of claim 15, wherein the computer instructions, when executed by the hardware processor, further cause the hardware processor to perform:
- receive stored data at the storage controller read from the non-volatile storage device;
- determine that the non-volatile storage device is a mirrored non-volatile storage device based on the corresponding register bit being set; and
- reverse a data bit order at the storage controller for the stored data.

* * * * *